United States Patent
Yoon et al.

(10) Patent No.: US 11,145,888 B2
(45) Date of Patent: *Oct. 12, 2021

(54) LITHIUM SECONDARY BATTERY

(71) Applicant: SK INNOVATION CO., LTD., Seoul (KR)

(72) Inventors: Dock Young Yoon, Daejeon (KR); Jee Hee Lee, Daejeon (KR); Sang Jin Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 55 days.

This patent is subject to a terminal disclaimer.

(21) Appl. No.: 15/991,017

(22) Filed: May 29, 2018

(65) Prior Publication Data

US 2018/0342755 A1 Nov. 29, 2018

(30) Foreign Application Priority Data

May 29, 2017 (KR) .................. 10-2017-0065943

(51) Int. Cl.
| | |
|---|---|
| *H01M 4/583* | (2010.01) |
| *H01M 10/052* | (2010.01) |
| *H01M 4/133* | (2010.01) |
| *H01M 4/66* | (2006.01) |
| *H01M 4/587* | (2010.01) |
| *H01M 10/0525* | (2010.01) |
| *H01M 4/02* | (2006.01) |
| *H01M 50/409* | (2021.01) |
| *H01M 4/1393* | (2010.01) |

(52) U.S. Cl.
CPC ......... *H01M 10/052* (2013.01); *H01M 4/133* (2013.01); *H01M 4/587* (2013.01); *H01M 4/661* (2013.01); *H01M 10/0525* (2013.01); *H01M 4/1393* (2013.01); *H01M 4/583* (2013.01); *H01M 50/409* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| | | | | |
|---|---|---|---|---|
| 2002/0197201 A1* | 12/2002 | Fukuda | ................ | H01M 4/587 423/448 |
| 2010/0086856 A1* | 4/2010 | Matsumoto | ........... | H01M 4/587 429/231.8 |
| 2010/0136432 A1 | 6/2010 | Kim | | |
| 2016/0126543 A1* | 5/2016 | Ota | ....................... | H01M 10/04 429/231.95 |
| 2016/0181612 A1* | 6/2016 | Lee | ....................... | H01M 4/587 429/231.8 |
| 2019/0237763 A1* | 8/2019 | Wakizaka | ............ | H01M 4/587 |

FOREIGN PATENT DOCUMENTS

| | | | |
|---|---|---|---|
| JP | 2013-201104 A | 10/2013 | |
| JP | 5601186 B2 | 10/2014 | |
| KR | 10-1057162 B1 | 8/2011 | |
| KR | 10-1395403 B1 | 5/2014 | |
| KR | 10-2015-0073107 A | 6/2015 | |
| KR | 10-1631735 B1 | 6/2016 | |
| KR | 10-2016-0149762 A | 12/2016 | |
| WO | WO 2014/157318 A1 | 10/2014 | |
| WO | WO 2015/093894 * | 6/2015 | ............. H01G 11/24 |

OTHER PUBLICATIONS

Office action dated May 28, 2021 from Korean Patent Office in a counterpart Korean Patent Application No. 10-2017-0065943 (English translation is also submitted herewith.).

* cited by examiner

*Primary Examiner* — Jeremiah R Smith
(74) *Attorney, Agent, or Firm* — The PL Law Group, PLLC

(57) ABSTRACT

A lithium secondary battery includes a cathode, an anode and a non-aqueous electrolyte. The anode includes an anode active material which contains a mixture of an artificial graphite and a natural graphite. A sphericity of the natural graphite is 0.96 or more. The lithium secondary battery including the anode has improved life-span and power properties.

4 Claims, No Drawings

LITHIUM SECONDARY BATTERY

CROSS-REFERENCE TO RELATED APPLICATION AND CLAIM OF PRIORITY

This application claims priority to Korean Patent Applications No. 10-2017-0065943 filed on May 29, 2017 in the Korean Intellectual Property Office (KIPO), the entire disclosure of which is incorporated by reference herein.

BACKGROUND

1. Field

The present invention relates to a lithium secondary battery having improved power and life-span properties

2. Description of the Related Art

Demands for a lithium secondary battery are increasing as a power source of a mobile electronic device such as a camcorder, a mobile phone, a laptop computer, etc., according to developments of information and display technologies.

Recently, the secondary battery is being developed and applied as an eco-friendly power source of an electric automobile, an uninterruptible power supply, an electrically-driven tool.

The lithium secondary battery may include a cathode and an anode, each of which includes a current collector and an active material coated thereon. A porous separation layer may be interposed between the cathode and the anode to form an electrode assembly. The electrode assembly may be impregnated by a non-aqueous electrolyte including lithium salts. A transition metal compound such as lithium cobalt oxide ($LiCoO_2$), lithium nickel oxide ($LiNiO_2$), lithium manganese oxide ($LiMnO_2$), etc., may be used as a cathode active material of the lithium secondary battery. A crystalline carbon-based material such as a natural graphite or an artificial graphite which may generally have a high softening degree, or an amorphous or low crystalline carbon-based material having a pseudo-graphite structure or a turbostratic structure which may be obtained by a carbonization of a hydrocarbon material or a polymer at a low temperature from about 1000° C. to about 1500° C. may be used as an anode active material of the lithium secondary battery.

However, the lithium secondary battery including the natural graphite as the anode active material may have a high electrode expansion rate to cause a poor life-span. If the artificial graphite is introduced as the anode active material to overcome the poor life-span, a power output of the battery may not be improved and a resistance may be increased. If a high density active material mixture is employed to an electrode for implementing a lithium secondary battery of a high capacity, the life-span may be also degraded and a high-performance battery may not be easily implemented.

For example, Korean Registered Patent Publication No. 1057162 discloses a metal-carbon complex anode active material which may not provide sufficient power output and life-span.

SUMMARY

According to an aspect of the present invention, there is provided a lithium secondary battery having improved power output and life-span.

According to exemplary embodiments, a lithium secondary battery includes a cathode, an anode and a non-aqueous electrolyte. The anode includes an anode active material which contains a mixture of an artificial graphite and a natural graphite. A sphericity of the natural graphite is 0.96 or more.

In some embodiments, the sphericity of the natural graphite may be 0.98 or more.

In some embodiments, an average particle diameter ($D_{50}$) of the natural graphite may be in a range from 9 μm to 14 μm.

In some embodiments, a half value width in a particle size distribution of the natural graphite may be 10 μm or less.

In some embodiments, a half value width in a particle size distribution of the natural graphite may be 9 μm or less.

In some embodiments, a mixing weight ratio of the natural graphite and the artificial graphite may be in a range from 10:1 to 1:1.

In some embodiments, an anode expansion rate represented by Equation 1 below may be 20% or less.

$$\text{Anode expansion rate } (\%) = 100 \times (T_2 - T_1)/(T_1) \quad \text{[Equation 1]}$$

In the Equation 1, $T_1$ is a thickness of the anode at 0% SOC (State Of Charge), and $T_2$ is a thickness of the anode at 100% SOC.

DETAILED DESCRIPTION

According to example embodiments of the present invention, a lithium secondary battery including a cathode, an anode and a non-aqueous electrolyte is provided. The anode includes an anode active material which contains a mixture of an artificial graphite, and a natural graphite having a sphericity of 0.96 or more so that the lithium secondary battery may have improved power output and life-span.

Hereinafter, the present invention will be described in detail with reference to exemplary embodiments. However, those skilled in the art will appreciate that such embodiments are provided to further understand the spirit of the present invention and do not limit subject matters to be protected as disclosed in the detailed description and appended claims.

Anode Active Material and Anode

According to exemplary embodiments, an anode includes an anode active material which contains a mixture of an artificial graphite, and a natural graphite having a sphericity of 0.96 or more.

The term "sphericity" used herein may be defined as follow:

Sphericity=a circumference length of a circle having the same area as a projection of a natural graphite particle/a real circumference length of the projection of the natural graphite particle According to exemplary embodiments, the artificial graphite may be mixed in the anode active material so that a filter clogging or a poor slurry dispersion during a mixing process may be prevented, and life-span and high temperature storage property may be improved.

According to exemplary embodiments, the natural graphite having the sphericity of 0.96 or more may be mixed in the anode active material so that an electrode density may be enhanced, and an electrode expansion may be suppressed. Thus, life-span and power output of a lithium secondary battery may be improved. In an embodiment, the sphericity of the natural graphite may be 0.98 or more in consideration of the above mentioned aspects.

Further, the natural graphite having the sphericity of 0.96 or more may be used so that a change of an anode expansion rate when a mixing weight ratio of the natural graphite and the artificial graphite is changed may be suppressed. Thus, the mixing weight ratio of the natural graphite and the artificial graphite may be properly controlled in the lithium secondary battery including the anode according to exemplary embodiments.

In an embodiment, an electrode expansion rate of the anode may be about 20% or less, for example, about 17% or less. Thus, the lithium secondary battery may have excellent long-term stability and life-span. For example, a discharge capacity reduction rate may be from about 1% to about 5% even after 500 cycles of charging and discharging in the lithium secondary battery.

The electrode expansion rate of the anode may be calculated by Equation 1 below.

$$\text{Anode expansion rate (\%)}=100\times(T_2-T_1)/(T_1) \quad \text{[Equation 1]}$$

In the Equation 1, $T_1$ is a thickness of the anode at 0% SOC (State Of Charge), and $T_2$ is a thickness of the anode at 100% SOC.

The thickness of the anode at 0% SOC is a thickness in a state that the battery is substantially fully discharged. The fully discharged state may include, e.g., a non-charged state after fabrication of the anode, a theoretically fully discharged state or a substantial fully discharged state (e.g., within ±0.5% from the theoretically fully discharged state).

The thickness of the anode at 100% SOC is a thickness in a state that the battery is substantially fully charged. The fully charged state may indicate a maximally charged state with respect to a battery capacity in a normal use, and may include a range of ±0.5% from a theoretically fully charged state.

Charging and discharging conditions for 0% or 100% SOC may be properly adjusted. For example, the charging condition may be set as CC-CV 1.0 C 4.2V 0.1 C CUT-OFF, and the discharging condition may be set as CC 1.0 C 2.5V CUT-OFF.

The anode expansion rate may be controlled by adjusting an average diameter of a graphite particle, a pellet density, a particle density change rate, a PSD half value width, a mixing weight ratio of the natural graphite and the artificial graphite, etc., as described below.

In some embodiments, an average particle diameter ($D_{50}$) may be in a range from about 9 μm to about 14 μm. The term "$D_{50}$" used herein indicate a particle diameter at 50% volume fraction in a cumulative particle size distribution.

If the average particle diameter ($D_{50}$) is less than about 9 μm, pores in the anode may not be easily controlled and an impregnation uniformity may be degraded. If the average particle diameter ($D_{50}$) exceeds about 14 μm, an electrode thickness may be increased and the electrode expansion rate may not be easily controlled.

A power output of a secondary battery including a natural graphite as an anode active material may be influenced by the particle diameter. According to exemplary embodiments, the power output from the anode active material may be enhanced within the $D_{50}$ range from about 9 μm to about 14 μm, preferably from about 10 μm to about 12 μm. Within this range, the improved power output may be achieved while preventing an excessive transformation of the electrode during repetitive charging and discharging.

In an embodiment, the natural graphite having a pellet density which is represented by Equation 2 below of 0.06 or less may be used. In this case, the anode electrode expansion rate may be effectively suppressed. Within this range, a packing of active material particles may be efficiently implemented so that pores between the particles of the natural graphite may be minimized. For example, the pellet density change rate may be 0.04 or less so that the packing of the active material particle may be enhanced to suppress the anode expansion rate more efficiently.

$$\text{Pellet density change rate}=(Da-Db)/(a-b) \quad \text{[Equation 2]}$$

In the Equation 2 above, Da represents a pellet density (g/cc) measured by inputting 2.5 g of a natural graphite in a hole with a 1 cm diameter and then applying a pressure of 8 kN for 5 seconds, Db represents a pellet density measured by applying a pressure of 1 kN for 5 seconds, a represents 8 kN and b represents 1 kN.

The pellet density may be measured using a powder resistance measuring device. Specifically, 2.5 g of a natural graphite may be input in a hole with a 1 cm diameter, and then a predetermined pressure may be applied for 5 seconds. A height of the hole in a pressurized state may be measured using a micro gauge to obtain a volume, and the pellet density may be calculated by Equation 3 below.

$$\text{Pellet density}(D)=m/V \quad \text{[Equation 3]}$$

In the Equation 3 above, m represents a weight (g) of an anode active material under a specific pressure, and V represents a volume (cc) of the anode active material under the specific pressure.

A method for obtaining the pellet density change rate is not specifically limited. For example, a half value width in a particle size distribution with respect to the natural graphite particle may be set as 10 μm or less to obtain the pellet density. In an embodiment, the half value width may be set as 9 μm or less to obtain the natural graphite having improved packing of the active material particle.

When a value of a longitudinal axis in a particle size distribution graph of the natural graphite particle is a half of a maximum value of the graph, a width of a lateral axis between the two values may be determined as the half value width used herein.

The natural graphite used herein may be a natural graphite coated by a carbide layer on at least an edge portion thereof. The carbide layer may be formed by coating a core carbon material with a coal-based or a petroleum-based pitch, tar, or a mixture thereof, and then carbonizing by firing to have a low crystallinity. The term "low crystallinity" used herein may indicate that the crystallinity of the carbide layer is less than that of the natural graphite. The carbide layer may fill micro-pores in the natural graphite to reduce a specific surface area, and thus sites at which a decomposition reaction of an electrolyte occurs may be decreased so that charging/discharging efficiency, cycle capacity retention and life-span properties of the lithium secondary battery may be enhanced.

For example, in a fabrication of the natural graphite coated by the carbide layer, a particle-shaped natural graphite and a carbon-based material derived from coal or petroleum may be mixed by a wet or dry method to form a carbon coating layer on the natural graphite. The natural graphite including the coating layer thereon may be fired to form the carbide layer on at least an edge portion of the natural graphite.

In an embodiment, a mixing weight ratio of the natural graphite and the artificial graphite in the anode active material may be in a range from 10:1 to 1:1, preferably, from 9:1 to 7:3. Within this range, an anode density may be increased and the electrode expansion rate may be remarkably decreased so that life-span and power output properties of the lithium secondary battery may be further improved.

In some embodiments, the anode active material may further include ingredients commonly used in an anode of a lithium secondary battery without departing from the spirit and concepts of the present invention. For example, the anode active material may further include at least one of lithium, a lithium alloy, lithium titanate, silicon, a tin alloy, cokes, a combusted organic polymer or a carbon fiber. An amount of the additional ingredient may be, e.g., about 10 wt % or less. For example, the additional ingredient may not be included in the anode active material.

Cathode Active Material

According to exemplary embodiments, a cathode active material commonly used for a cathode of a conventional electrochemical device may be used. For example, a lithium intercalation compound such as a complex oxide including lithium manganese oxide, lithium cobalt oxide, lithium nickel oxide or a combination thereof may be used.

Lithium Secondary Battery

According to exemplary embodiments, a lithium secondary battery using the cathode active material and the anode active material as described above is also provided.

The lithium second battery may include a cathode, an anode and a non-aqueous electrolyte.

Each of the cathode active material and the anode active material may be mixed and stirred with a solvent and optionally with a binder, a conductive agent, a dispersive agent, etc., to form a mixture. The mixture may be coated on a metallic current collector, and then pressed and dried to form the cathode and the anode.

The binder may include, e.g., an organic binder such as a copolymer of vinylidenefluoride and hexafluoropropylene (PVDF-co-HFP), polyvinylidenefluoride (PVDF), polyacrylonitrile, polymethylmethacrylate, etc., or an aqueous binder such as styrene-butadiene rubber (SBR) that may be used with a thickening agent such as carboxymethyl cellulose (CMC).

A conductive carbon-based material may be used as the conductive agent.

The metal current collector may include a metal having a high conductivity which may not be reactive within a voltage range of the battery and may be easily coated with the mixture of the anode active material or the cathode active material. A cathode current collector may include, e.g., a foil prepared from aluminum, nickel or a combination thereof. An anode current collector may include, e.g., copper, gold, nickel, a copper alloy or a combination thereof.

A separator may be interposed between the cathode and the anode. The separator may include a porous polymer film. For example, a polyolefin-based polymer including at least one of ethylene homopolymer, propylene homopolymer, ethylene/butene copolymer, ethylene/hexene copolymer or ethylene/methacrylate copolymer may be used. A conventional porous non-woven fabric, a glass having a high melting point, a polyethylene terephthalate fiber may be also used in the separator. The separator may be applied in the battery by winding, laminating, stacking, folding, etc., with the electrodes.

A non-aqueous electrolyte may include a lithium salt and an organic solvent. The lithium salt commonly used in an electrolyte for a lithium secondary battery may be used. Non-limiting examples of the organic solvent may include propylene carbonate (PC), ethylene carbonate (EC), diethyl carbonate (DEC), dimethyl carbonate (DMC), ethyl methyl carbonate (EMC), methyl propyl carbonate, dipropyl carbonate, fluoro ethylene carbonate (FEC), dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

The non-aqueous electrolyte may be injected to an electrode assembly including the cathode, the anode and the separator interposed therebetween to form the lithium secondary battery.

The lithium secondary battery may be fabricated as, e.g., a cylindrical shape using a can, a pouch shape or a coin shape.

Hereinafter, exemplary embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

<Fabrication of Anode>

A natural graphite having a sphericity of 0.96, a $D_{50}$ of 10 μm, a half value width in PSD of 8.4 μm, and an artificial graphite having a $D_{50}$ of 15 μm were mixed by a weight ratio of 7:3 to prepare an anode active material. An aqueous binder was prepared by mixing styrene butadiene rubber (SBR) and carboxy methyl cellulose (CMC) by a weight ratio of 5:5, and a flake graphite was used as a conductive agent.

The anode active material, the conductive agent and the binder were mixed by a weight ratio of 93:5:2, and then dispersed in water to form an anode slurry. The anode slurry was coated on a copper thin layer, dried and pressed by a pressure of 3.8 MPa to form an anode for a lithium secondary battery.

The sphericity of the natural graphite was measured using MORPHOLOGI G3 manufactured by Malvern Co., Ltd.

<Fabrication of Lithium Secondary Battery>

The anode as prepared above, a cathode including LiNiMnCoO$_2$, a separator (CELGARD 2400) and an aluminum case were used to form a lithium secondary battery. A dimension of the prepared battery was 4.5 mm (thickness)× 64 mm (width)×95 mm (length), and a capacity of the prepared battery was 2,000 mAh.

Examples 2-12, and Comparative Examples 1-3

Lithium secondary batteries of Examples 2-12 and Comparative Examples 1-3 were prepared by a method the same as that of Example 1 except that parameters or conditions were changed as listed in Table 1 below.

Experimental Example

1. Measuring Anode Expansion Rate

A thickness before charging of the anode in each Examples and Comparative Examples was measured as $T_1$, and a cell was prepared after a vacuum drying for a day. The cell was charged (CC-CV 1.0 C 4.2V 0.1 C CUT-OFF), and then disassembled in a dry room. A thickness of the anode was measured as $T_2$, and an anode expansion rate was obtained based on Equation 1 below. The results are shown in Table 1 below.

$$\text{Anode expansion rate (\%)}=100\times(T_2-T_1)/(T_1) \quad [\text{Equation 1}]$$

2. Evaluation of Power Output

A power output property at 50% SOC was measured using a method of HPPC (Hybrid Pulse Power Characterization by Freedom Car Battery Test Manual) in each battery of Examples and Comparative Examples. The results are shown in Table 1 below.

3. Evaluation of Life-Span Property 1500 cycles of charging (CC-CV 1.0 C 4.2V 0.1 C CUT-OFF) and discharging (CC 1.0 C 2.5V CUT-OFF) were repeated in each battery of Examples and Comparative Examples. A ratio (%) of a discharging capacity at 1500th cycle relative to a discharging capacity at a first cycle was calculated to evaluate a life-span of each battery. The results are shown in Table 1 below.

TABLE 1

| | Sphericity | $D_{50}$ | Half Value Width | Mixing Weight Ratio (natural graphite/artificial graphite) | Anode Expansion Rate (%) | Discharging Power (W/kg) | Lifespan (%) (1500 cycle) |
|---|---|---|---|---|---|---|---|
| Example 1 | 0.96 | 10 | 8.4 | 3:7 | 22.5 | 2374 | 93.1 |
| Example 2 | 0.96 | 10 | 8.4 | 5:5 | 19.9 | 3220 | 93.8 |
| Example 3 | 0.96 | 10 | 8.4 | 7:3 | 20.5 | 3433 | 93.3 |
| Example 4 | 0.98 | 10 | 8.4 | 3:7 | 20.0 | 2611.4 | 93.5 |
| Example 5 | 0.98 | 10 | 8.4 | 5:5 | 17.91 | 3542 | 93.7 |
| Example 6 | 0.98 | 10 | 8.4 | 7:3 | 18.45 | 3776.3 | 94 |
| Example 7 | 0.96 | 10 | 10.4 | 3:7 | 24.2 | 2320 | 92.2 |
| Example 8 | 0.96 | 10 | 10.4 | 5:5 | 20.6 | 3014 | 92.7 |
| Example 9 | 0.96 | 10 | 10.4 | 7:3 | 21.4 | 3364 | 92.5 |
| Example 10 | 0.96 | 15.7 | 9.6 | 3:7 | 23.5 | 2302 | 92.5 |
| Example 11 | 0.96 | 15.7 | 9.6 | 5:5 | 20.4 | 3029 | 92.9 |
| Example 12 | 0.96 | 15.7 | 9.6 | 7:3 | 21.1 | 3230 | 93.0 |
| Comparative Example 1 | 0.92 | 10 | 8.4 | 3:7 | 25.3 | 2281 | 91.5 |
| Comparative Example 2 | 0.92 | 10 | 8.4 | 5:5 | 23.4 | 2888 | 92.3 |
| Comparative Example 3 | 0.92 | 10 | 8.4 | 7:3 | 21.9 | 3214 | 92.1 |

Referring to Table 1, the lithium secondary batteries of Examples showed improved life-span properties and higher power properties.

According to the mixing weight ratio of the natural graphite and the artificial graphite, the batteries of Example 2 and 3 showed greater power and life-span properties than those of Example 1. The batteries of Example 5 and 6 showed greater power and life-span properties than those of Example 4. The batteries of Example 8 and 9 showed greater power and life-span properties than those of Example 7. The batteries of Example 11 and 12 showed greater power and life-span properties than those of Example 10.

When the half value width was 9 μm or less, and an average diameter was in a range from 9 μm to 14 μm as in Examples 1-6, the life-span and power properties were further enhanced.

However, the batteries of Comparative Examples showed degraded life-span and power properties.

What is claimed is:

1. A lithium secondary battery, comprising:
    a cathode;
    an anode comprising an anode active material comprised of a mixture of an artificial graphite and a natural graphite, wherein a sphericity of the natural graphite is 0.98 or more; and
    a non-aqueous electrolyte,
    wherein an average particle diameter ($D_{50}$) of the natural graphite is in a range from 9 μm to 14 μm, and a mixing weight ratio of the natural graphite and the artificial graphite is in a range from 9:1 to 1:1; and
    an anode expansion rate represented by Equation 1 below is 20% or less:

anode expansion rate (%)=100×($T_2$-$T_1$)/($T_1$)  [Equation 1]

wherein $T_1$ is a thickness of the anode at 0% state of charge (SOC), and $T_2$ is a thickness of the anode at 100% SOC; and
    wherein a pellet density change rate of the natural graphite which is represented by Equation 2 is 0.06 or less:

Pellet density change rate=($Da$-$Db$)/($a$-$b$)  [Equation 2]

wherein Da represents a pellet density (g/cc) measured by inputting 2.5 g of the natural graphite in a hole with a 1 cm diameter and then applying a pressure of 8 kN for 5 seconds, Db represents a pellet density measured by applying a pressure of 1 kN for 5 seconds, a represents 8 kN and b represents 1 kN.

2. The lithium secondary battery of claim 1, wherein a half value width in a particle size distribution of the natural graphite is 10 μm or less.

3. The lithium secondary battery of claim 1, wherein a half value width in a particle size distribution of the natural graphite is 9 μm or less.

4. The lithium secondary battery of claim 1, wherein the natural graphite includes a carbide layer coated thereon.

* * * * *